United States Patent
Paran et al.

(10) Patent No.: US 11,798,004 B1
(45) Date of Patent: Oct. 24, 2023

(54) SYSTEM, METHOD, AND COMPUTER PROGRAM FOR DYNAMICALLY GENERATING ASSISTANCE INFORMATION FOR CUSTOMER SERVICE AGENTS

(71) Applicant: Amdocs Development Limited, Limassol (CY)

(72) Inventors: Eran Yosef Paran, Hod Hasharon (IL); Liat Taub Bahar, Kfar Sabba (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 145 days.

(21) Appl. No.: 16/985,105

(22) Filed: Aug. 4, 2020

(51) Int. Cl.
G06Q 30/02 (2023.01)
G06Q 30/016 (2023.01)

(52) U.S. Cl.
CPC ....... *G06Q 30/016* (2013.01); *G06Q 30/0281* (2013.01)

(58) Field of Classification Search
CPC .. G06Q 30/01; G06Q 30/016; G06Q 30/0281; Y04S 50/14
See application file for complete search history.

(56) References Cited

U.S. PATENT DOCUMENTS

| | | | |
|---|---|---|---|
| 10,453,032 B1* | 10/2019 | Obeng | H04L 43/065 |
| 11,200,742 B1* | 12/2021 | Post | G06T 19/003 |
| 2007/0255619 A1 | 11/2007 | Ekchian | |
| 2009/0150296 A1 | 6/2009 | Kirovski et al. | |
| 2010/0142698 A1 | 6/2010 | Spottiswoode et al. | |
| 2011/0004481 A1 | 1/2011 | Jones | |
| 2014/0143026 A1* | 5/2014 | Nies | G06Q 10/06398 705/7.42 |
| 2014/0297363 A1* | 10/2014 | Vemana | G06Q 30/0269 705/7.29 |
| 2016/0171577 A1* | 6/2016 | Robinson, Jr. | H04W 4/33 705/7.13 |
| 2016/0196561 A1* | 7/2016 | Iyer | G06Q 50/01 705/304 |
| 2017/0039605 A1* | 2/2017 | Khattar | G06Q 30/016 |
| 2017/0193506 A1* | 7/2017 | Karnati | G06Q 20/3226 |
| 2017/0337602 A1* | 11/2017 | Davis | G06V 40/174 |

(Continued)

OTHER PUBLICATIONS

Ghavamipoor, Hoda, and S. Alireza Hashemi Golpayegani. "A reinforcement learning based model for adaptive service quality management in e-commerce websites." Business & Information Systems Engineering 62 (2019): 159-177. (Year: 2019).*

(Continued)

*Primary Examiner* — Brendan S O'Shea
(74) *Attorney, Agent, or Firm* — Zilka-Kotab, P.C.

(57) ABSTRACT

As described herein, a system, method, and computer program are provided for dynamically generating assistance information for customer service agents. In use, presence of a customer at a physical retail store is identified. Additionally, information describing the customer is processed, using a machine learning model, to determine an expected outcome of an interaction with the customer occurring within the physical retail store. It is then determined that the customer is to be assisted by a customer service agent. Further, assistance information for the customer service agent is dynamically generated, based at least in part on the expected outcome of the interaction with the customer.

14 Claims, 5 Drawing Sheets

(56) References Cited

U.S. PATENT DOCUMENTS

2020/0258141 A1      8/2020  Habraken
2020/0364723 A1 *   11/2020  Gitlevich ............. G06Q 30/016

OTHER PUBLICATIONS

Paran et al., U.S. Appl. No. 16/985,073, filed Aug. 4, 2020.
Non-Final Office Action from U.S. Appl. No. 16/985,073, dated Sep. 15, 2022.
Lam et al., "Optimizing Customer-Agent Interactions with Natural Language Processing and Machine Learning," Systems and Information Engineering Design Symposium (SIEDS), 2019, 6 pages.
Siebers et al., "Using intelligent agents to understand management practices and retail productivity," Proceedings of the Winter Simulation Conference, 2007, pp. 2212-2220.
Final Office Action from U.S. Appl. No. 16/985,073, dated Jan. 30, 2023.
Aguilar-Palacios et al., "Forecasting Promotional Sales Within the Neighbourhood," IEEE Access, vol. 7, 2019, pp. 74759-74775.
Sun et al.,"How do online consumers review negatively?" arXiv, 2020, 50 pages, retrieved from https://arxiv.org/abs/2004.13463.
Advisory Action from U.S. Appl. No. 16/985,073, dated Apr. 3, 2023.
Notice of Allowance from U.S. Appl. No. 16/985,073, dated May 30, 2023.

* cited by examiner

SYSTEM, METHOD, AND COMPUTER PROGRAM FOR DYNAMICALLY GENERATING ASSISTANCE INFORMATION FOR CUSTOMER SERVICE AGENTS

FIELD OF THE INVENTION

The present invention relates to processes used by customer service agents.

BACKGROUND

In a physical store, customer service agents interact with customers (e.g. to help the customers make purchases). Business entities would like to assist their customer service agents to the extent possible, in order to maximize sales and ensure customer satisfaction. This type of assistance is generally provided through preconfigured customer service agent training programs and predefining protocols to be followed by customer service agents when interacting with customers.

Thus, to date, any assistance information provided to customer service agents is static and consumed by customer service agents during a training process, or in any case is developed and consumed in a manner that irrespective of any real-time customer interaction. Thus, the customer service agents are not provided with any assistance information that is customized for real-time customer interactions, which means that the assistance information that is provided (i.e. in advance) is not ensured to be a best fit for a particular real-time scenario involving interaction of a specific customer service agent with a customer.

There is thus a need for addressing these and/or other issues associated with the prior art.

SUMMARY

As described herein, a system, method, and computer program are provided for dynamically generating assistance information for customer service agents. In use, presence of a customer at a physical retail store is identified. Additionally, information describing the customer is processed, using a machine learning model, to determine an expected outcome of an interaction with the customer occurring within the physical retail store. It is then determined that the customer is to be assisted by a customer service agent. Further, assistance information for a customer service agent is dynamically generated, based at least in part on the expected outcome of the interaction with the customer.

DETAILED DESCRIPTION

Figure 1:
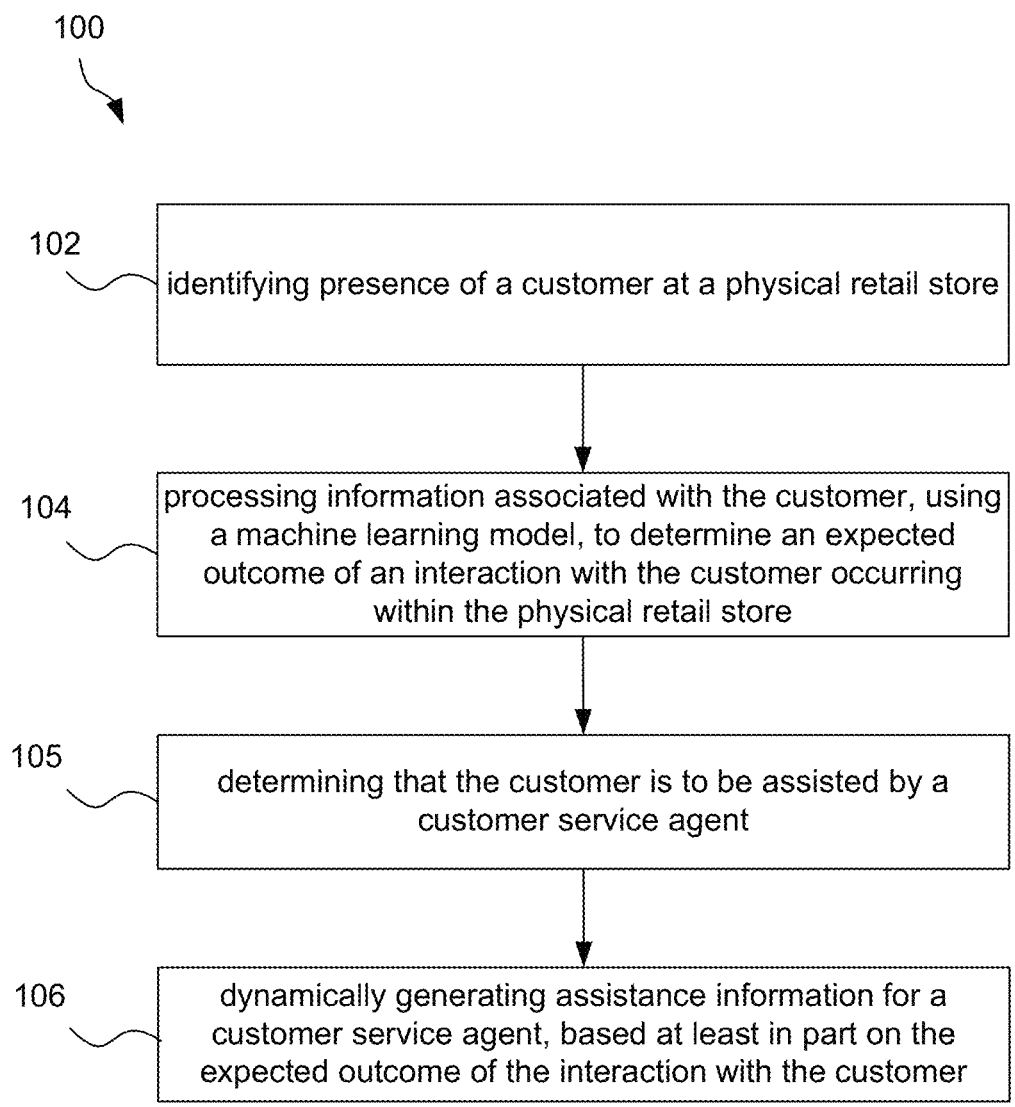
FIG. 1 illustrates a method for dynamically generating assistance information for a customer service agent, in accordance with one embodiment.

FIG. 1 illustrates a method for dynamically generating assistance information for a customer service agent, in accordance with one embodiment. The method 100 may be performed by a computer system (e.g. server), such as that described below with reference to FIGS. 5 and/or 6. For example, the method 100 may be performed by the computer system of a provider of the physical retail store, such as a communication service provider (CSP), in one embodiment.

As shown in operation 102, presence of a customer at physical retail store is identified. The presence of the customer may be identified using a sensor located on premises of the physical retail store, for example. The sensor may be a camera and/or microphone, as an option.

Optionally, the identification of the customer presence may include identification of the particular customer who is present in the retail store. For example, the particular customer may be identified using a facial recognition algorithm. As another example, the particular customer may be identified using mobile device recognition (e.g. a login of the customer to a network of the physical retail store). Of course, in other embodiments the particular customer may not necessarily be identified, but instead just a general indication of the customer presence in the store may be identified.

In one embodiment, information describing the customer may be collected. The information may be collected from various data sources. For example, the information may include demographic information, information indicating prior purchases, information indicating a current mood, information indicating a current context of the presence in the physical store, etc.

In one exemplary embodiment, the customer may be included in a customer group identified as having a presence at a physical retail store. For example, the customer may be present in the physical retail store with a group of other people, such as friends or family members. In this case, the customer may be selected from the other customers in the customer group based on one or more criteria, such as whether the customer is an influencer and/or decision maker within the customer group. The information collected for the customer may be used to determine whether the customer meets the criteria.

Additionally, in operation 104, information associated with the customer is processed, using a machine learning model, to determine an expected outcome of an interaction with the customer occurring within the physical retail store. The machine learning model may be trained to infer, for a customer, an outcome expected with respect to an interaction with the customer occurring within the physical retail store. The interaction may be specific to a particular customer service agent of the physical retail store or any customer service agent of the retail store. The interaction may include an agent communicating with the customer to provide retail assistance.

In one embodiment, the machine learning model may be trained using prior retail behavior recorded for the customer, or other similar customers, by a provider (e.g. CSP) of the physical retail store. For example, the data collected by the provider may include face and image recognition (e.g. recognizing the customer from previous visits, learning things from his appearance) and/or information from a store queue management system (e.g. customer identity and visit purpose based on queue system records). In another embodiment, the machine learning model may be trained using data in a customer relationship management (CRM) system (e.g.

of the provider). The CRM data may include personal information, products and services purchased, previous interactions, bill analysis for detailed spending, etc. In yet another embodiment, the machine learning model may be trained using publicly available data. The public data may include personal details collected from social networks (e.g. birthday, marital status, domains of interest, etc.). In yet another embodiments, the machine learning model may be trained using demographics of customers (e.g. men versus women), type of equipment the customer has (e.g. if a person comes to buy shoes, may be the type and cost of shoes he is wearing is relevant), or any other data capable of being used to train the machine learning model to determine the expected outcome.

To this end, the information that is processed by the machine learning model to determine the expected outcome may include an identifier (e.g. unique identifier) of the customer, or any other information describing the customer that is capable of being used by the machine learning model to determine the expected outcome.

In a further embodiment, the expected outcome may be determined for each customer service agent of a plurality of available customer service agents. For example, the machine learning model may take into consideration each customer service agent that is available to assist the customer. Thus, the machine learning model may be trained to determine expected outcomes for different agent/customer combinations. As an additional option, the machine learning model may be trained to determine an expected outcome for the scenario where no agent assists the customer.

It should be noted that the expected outcome may be defined in any desired manner, for example, using one or more key performance indicators (KPIs). In one embodiment, the expected outcome of the interaction with the customer may include a monetary value. The monetary value may be a positive value for customer purchases (e.g. of products or services), a negative value for customer refunds (e.g. return of product or services), and zero for when no customer action is taken. The monetary value may indicate a particular amount (e.g. based on a particular product expected to be purchased, etc.).

In another embodiment, the expected outcome may relate to customer churn. For example, the expected outcome may indicate whether the customer is expected to churn (i.e. unsubscribe from a service of the provider). In still yet another embodiment, the expected outcome may relate to a customer lifetime value. For example, if the customer is provided with a particular device, it may be expected that the customer will purchase services related to that device in the future. As another example, if the customer is treated nicely by an agent in the store when making a purchase, it may be expected that the customer is more likely to select the store for his next purchase, event if the next purchase is unrelated to the original purchase. Other embodiments are contemplated where the expected outcome indicates an objective of the customer (e.g. make a purchase, request customer service support on an owned device, etc.).

It should also be noted that the expected outcome may be determined at any point in time. For example, the expected outcome may be determined prior to an actual interaction between a customer service agent and the customer or during such an interaction.

It is then determined in operation 105 that the customer is to be assisted by a customer service agent. In one embodiment, determining that the customer is to be assisted by a customer service agent may include selecting the customer service agent from the plurality of available customer service agents based on the expected outcome determined for each customer service agent of the plurality of available customer service, for assigning the selected customer service agent to interact with the customer. The selected customer service agent may be one of the available customer service agents providing a best expected outcome, as determined based on any predefined criteria (e.g. KPIs, etc.).

Further, in operation 106, assistance information for the customer service agent is dynamically generated, based at least in part on the expected outcome of the interaction with the customer. With respect to the present embodiment, the assistance information includes any information capable of assisting (e.g. aiding, supporting, informing, etc.) the customer service agent with regard to an interaction with the customer.

In one embodiment, the assistance information may include at least a portion of the information describing the customer (e.g. demographics, past purchasing history, etc.). In another embodiment, the assistance information may include the expected outcome of the interaction with the customer occurring within the physical retail store. In yet another embodiment, the assistance information may include one or more suggested actions for the customer service agent to take in association with the customer, such as a language for the customer service agent to use that corresponds with a language of the customer, a particular offering (e.g. device or service for sale) to describe to the customer, or particular colors to show the device in, or to focus on particular features of the device being sold (e.g. the camera feature of the device). In still yet another embodiment, the assistance information may include a script for the customer service agent to use for interacting with the customer.

As an option, the assistance information may also be dynamically generated based on information associated with the customer service agent. This information associated with the customer service agent may include a skill level of the customer service agent (e.g. with regard to interacting with customers, knowledge of products and/or services for sale, etc.). In this way, the assistance information may be tailored to the skill level of the customer service agent.

To this end, the method 100 may be carried out to dynamically generate assistance information for the customer service agent, such that the assistance information is customized to at least the expected outcome (e.g. intent) determined for the customer, if not also customized to the customer service agent that is to interact with the customer in the physical retail store. This method 100 may allow the assistance information to be optimized per customer, per agent, and/or per business goal of the provider of the physical retail store.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
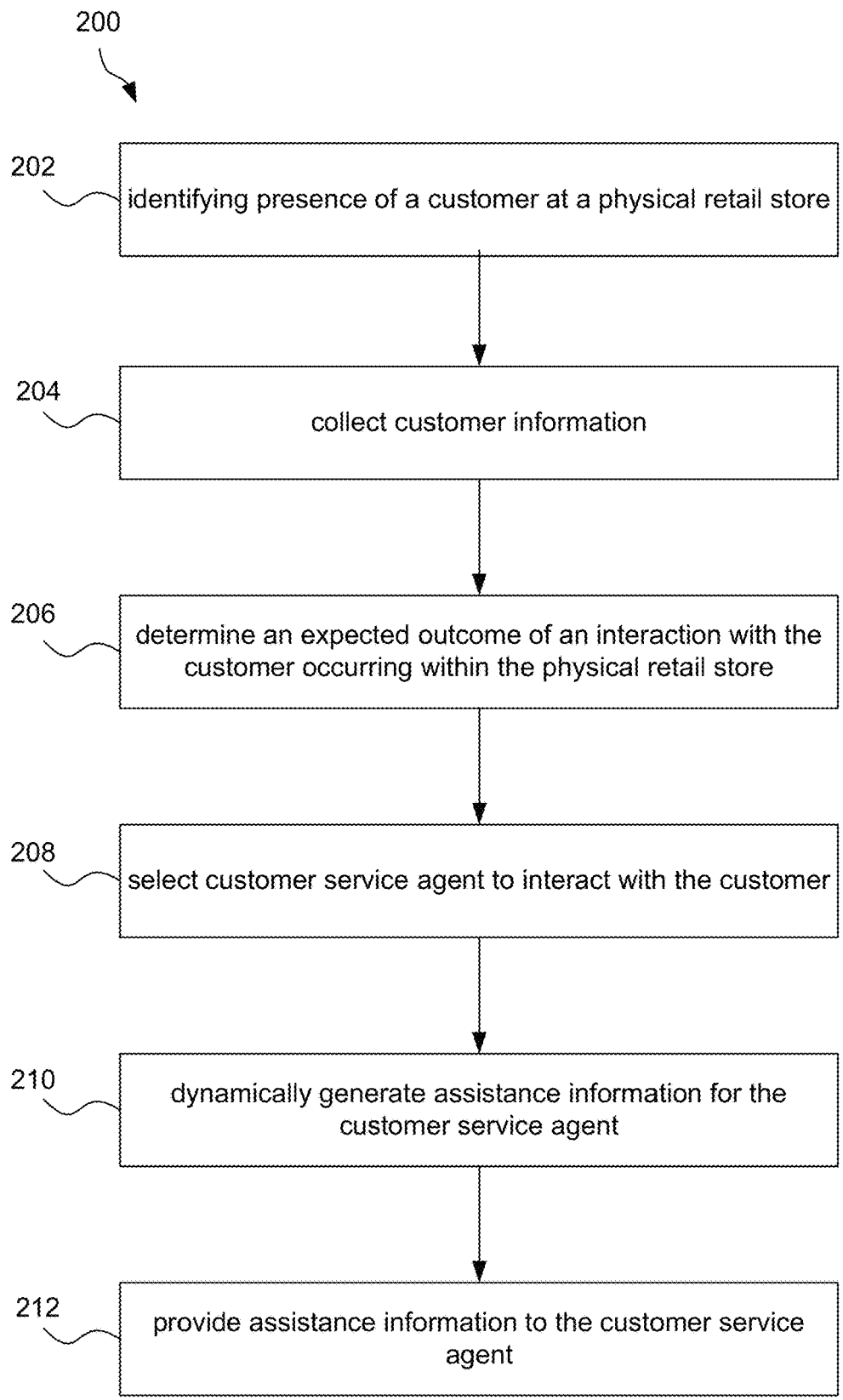
FIG. 2 illustrates a method for dynamically generating assistance information for use by a customer service agent in interacting with a particular customer having a presence in a physical retail store, in accordance with one embodiment.

FIG. 2 illustrates a method 200 for dynamically generating assistance information for use by a customer service agent in interacting with a particular customer having a presence in a physical retail store, in accordance with one embodiment. As an option, the method 200 may be carried out in the context of the details of the previous figure and/or any subsequent figure(s). Of course, however, the method 200 may be carried out in the context of any desired environment. Further, the aforementioned definitions may equally apply to the description below.

As shown in operation 202, presence of a customer at a physical retail store is identified. In one embodiment, face recognition may be used to identify the customer. As one option, a generic face recognition software may be used. As another option, a store trained face recognition algorithm may be used. For example, if the customer made a purchase in the physical retail store before, his face and his name may already be stored and he may be recognized again from that stored information (optionally pending the customer's approval to save his personal details and image).

In another embodiment, mobile device (e.g. cell phone) recognition may be used to identify the customer. For example, the mobile device may be identified through a queue or login mechanism in the store, such as when the customer is using the WiFi of the store. As another example, the mobile device may be identified through a Bluetooth beacon based identity system.

In yet another embodiment, the particular customer may not be identified (e.g. when face recognition or mobile device recognition are unable to identify the particular customer), but instead general information for the customer may be identified. For example, the customer may be identified using gender, age estimation, style of clothing, computing equipment (e.g. mobile device) on the customer's person, or any other generally identifiable information associated with the customer.

In one embodiment, the customer may be included in a customer group having a presence in the store. In this case, each customer in the customer group may be identified, as described above. As another option, the customer group itself may be identified using any group-related information. Thus, any reference to a "customer" may equally apply to a customer group. As another option, one customer in the customer group may be selected based on various criteria.

Additionally, in operation 204, information associated with the customer is identified. In one embodiment, the information may be collected from a customer relationship management (CRM) system used by the physical retail store. This CRM information may include personal information, products and/or services previously purchased, previous interactions between the customer and the provider of the physical retail store, bill analysis for detailed spending, etc. In another embodiment, the information may be collected from publicly available data, such as personal details collected from social networks (e.g. birthday, marital status, socio-demographics, domains of interest, etc.). In yet another embodiment, the information may be collected from point-of-sale data that is collected in real-time by the physical retail store, such as customer route in the store, personal appearance, companions for the visit, attention towards items in the store (e.g. devices/commercials/screens). In still yet another embodiment, the information may be collected from a camera in the store which captures mood via micro expressions of the customer when looking at products.

Further, in operation 206, information associated with the customer is processed, using a machine learning model, to determine an expected outcome of an interaction with the customer occurring within the physical retail store. One method for performing operation 206 is described in U.S. application Ser. No. 16/985,073, filed on Aug. 4, 2020 herewith, and entitled "MACHINE LEARNING SYSTEM, METHOD, AND COMPUTER PROGRAM FOR EVALUATION OF CUSTOMER SERVICE AGENTS", the entire contents of which are incorporated by reference herein.

In various embodiments, the expected outcome may indicate the objective of the customer, such as whether the customer has made a service visit to ask about insurance for his broken device, whether the customer is buying a product or service for a family member's birthday (as found out on social media), whether the customer is likely to purchase a new device, whether the customer is shopping for products/services the customer may have been convinced to purchase (e.g. came in for one device but his family member had a birthday yesterday), or other motivations that are relevant for making a purchase (e.g. came in to fix an old device but spent most of the time looking at the new devices in the store).

In a further embodiment, the expected outcome may be determined for each customer service agent of a plurality of available customer service agents. For example, the machine learning model may take into consideration each customer service agent that is available to assist the customer. As an additional option, the machine learning model may be trained to determine an expected outcome for the scenario where no agent assists the customer.

As a result of operation 202-206, information associated with the customer present in the physical retail store as well as the intent of the customer is known. Then, in operation 208, a customer service agent is selected to interact with the customer. An agent with a best fit for the specific customer and/or customer intent may be selected. There are many criteria that may be used to determine which agent is a best fit for the customer, or at least that may be used for selecting which agent to use for the customer. One of the criteria may be language, such that an agent that is able to speak the language used by the customer (e.g. as used within the customer group) may be selected. Another one of the criteria may be nationality, such that an agent with a same nationality as the customer may be selected. Optionally, the store can choose which agent to send to work with the customer based on the information collected in operation 202-206 and method described in U.S. application Ser. No. 16/985,073, filed on Aug. 4, 2020 herewith, and entitled "MACHINE LEARNING SYSTEM, METHOD, AND COMPUTER PROGRAM FOR EVALUATION OF CUSTOMER SERVICE AGENTS", the entire contents of which are incorporated by reference herein.

Still yet, in operation 210, assistance information is dynamically generated for the customer service agent. In one embodiment, the assistance information may be generated before the customer service agent interacts with the customer, and may be generated to support the interaction with the customer.

A method of presentation may be personal and based on the abilities/skills of the agent. For example, some agents may be given a script to follow on their personal tablet while other agents may get an "information tip" and figure out how to use it based on their experience.

In general, the assistance information may include customer information and suggested actions. The customer information may include, for example:

Customer name and when did the agent last talk to him

Whatever the customer told him last time

Information about the customer, such as name, language used, hobbies, likely intent, history with the store, history with the provider of the store, VIP status, social media recent events, etc.

For some agents, only part of the above information may be provided. For others, such as the more creative ones, more of the information may be provided as they can make use of the data.

The assistance information may also include suggested actions and/or scripts, and goals. For example, if the customer is determined to be at the store to buy a phone, the agent may be recommended to try to sell a certain phone to the customer and focus on how good the camera feature of the phone is. As another example, if the customer is coming to the store to complain, the agent may be recommended to be patient and listen to the customer. As another example, if the customer is very important, the agent may be recommended to provide help as much as needed. As yet another example, if the customer is identified as not liking to talk, the agent may be recommended to be very concrete.

Different agents may get different suggestions depending on what is determined to work best for them. Some agents may be consistently better performing then the dynamically generated scripts, in which case only the customer information may be provided. For less experience agents, concrete actions may be suggested.

Finally, in operation 212, the assistance information is provided to the customer service agent. The assistance information can be provided to the agent in multiple ways:

If the agent has a phone or a personal tablet, then the assistance information may be presented on the device.

If he has augmented reality (AR) glasses, then the assistance information may be presented on the lens of the glasses as the agent is talking to the customer.

The agent could have a hearing device for getting such assistance information.

The assistance information can be personally delivered to the agent.

Figure 3:
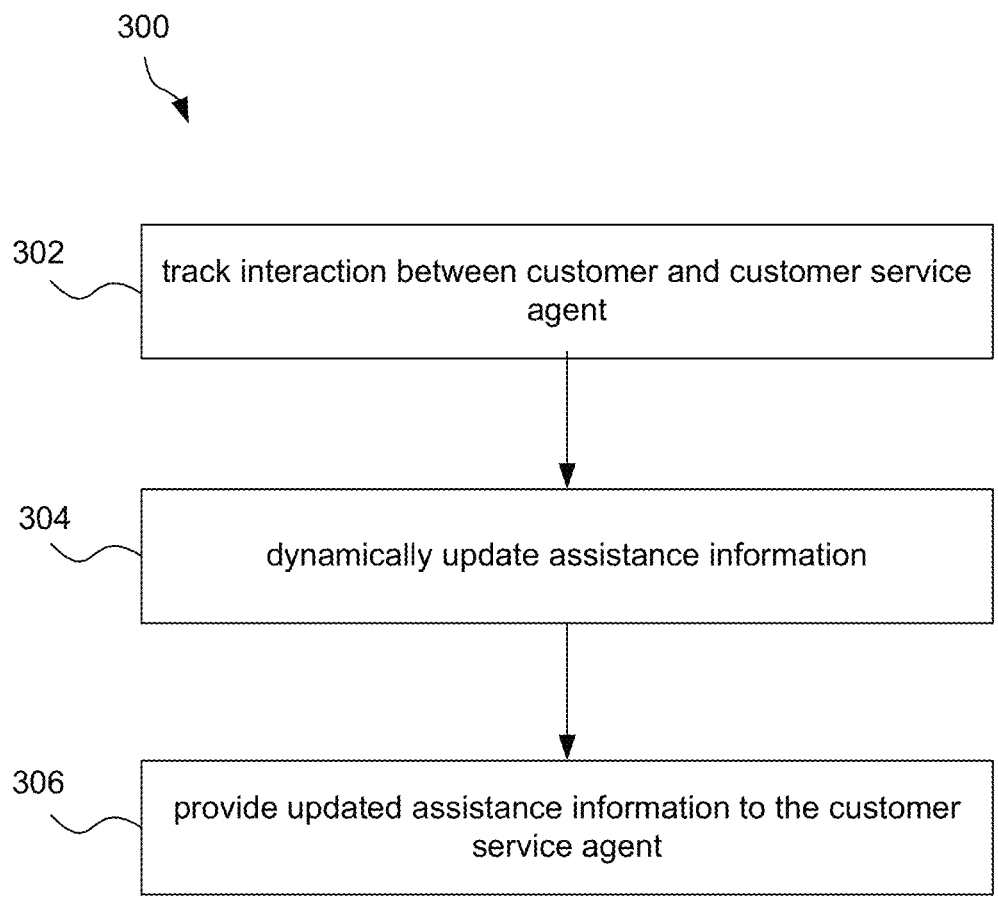
FIG. 3 illustrates a method for dynamically updating the assistance information generated using the method of FIG. 2, in accordance with one embodiment.

FIG. 3 illustrates a method 300 for dynamically updating the assistance information generated using the method 200 of FIG. 2, in accordance with one embodiment. Thus, the method 300 may be carried out in the context of the details of the previous figure and/or any subsequent figure(s). Of course, however, the method 300 may be carried out in the context of any desired environment. Further, the aforementioned definitions may equally apply to the description below.

As shown in operation 302, an interaction between a customer and a customer service agent is tracked. In one embodiment, on the agent there may be a device that is listening to the conversations the agent has with the customer. In another embodiment, cameras in the store may record and analyze the interaction. As a result, information associated with the information may be gathered, such as what the agent is saying, what the customer is saying, body language and micro expressions of the customer (and agent), what the customer is looking at, etc.

Then, in operation 304, the assistance information provided to the agent is dynamically updated. This may include changing the assistance information already provided to the agent, providing new assistance information to the agent, etc.

As the interaction with the customer is tracked (i.e. monitored), suggestions and information may be dynamically updated in real-time for being provided to the agent. Thus, the assistance information may be dynamically updated based on the tracking such that it is relevant to a current state of the interaction between the agent and the customer. The updated assistance information is then provided to the agent, as shown in operation 306.

In one exemplary embodiment where the agent is following a script, the script may be dynamically updated to include missing information. For example, data on some device that the agent is recommended to sell. Additionally, if the customer asks a questions, "How much people pay on average on this deal", the questions may be analyzed, and the next assistance data supplied may be a reply to the question. The dynamically updated assistance information may be provided in any of the same manners described above with reference to providing the originally generated assistance information.

In one optional embodiment, any of the information collected or determined using any of the methods described above may also be used for advertising purposes, such as changing in-store commercial screens to support customer decisions in real time.

Figure 4:
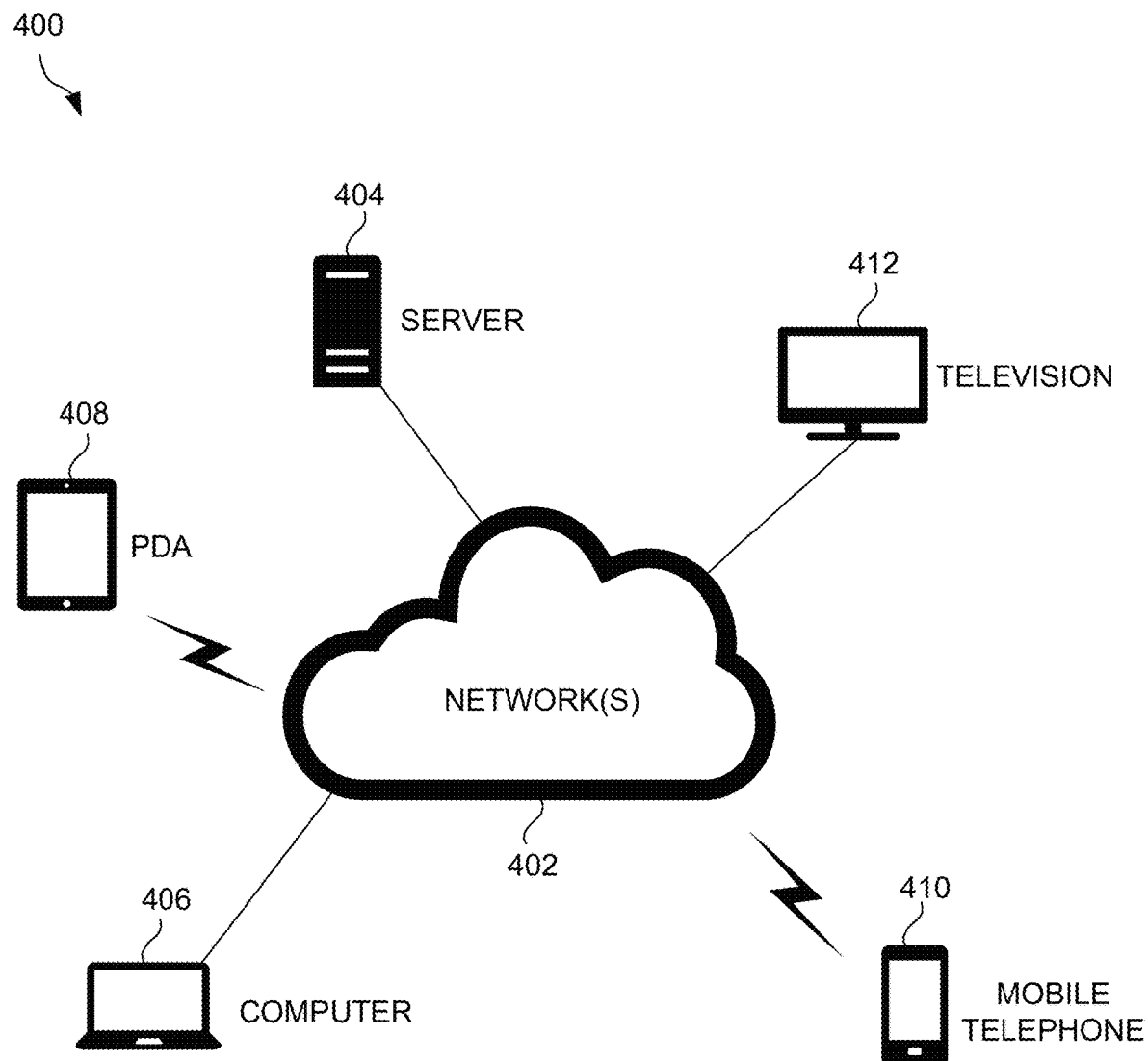
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
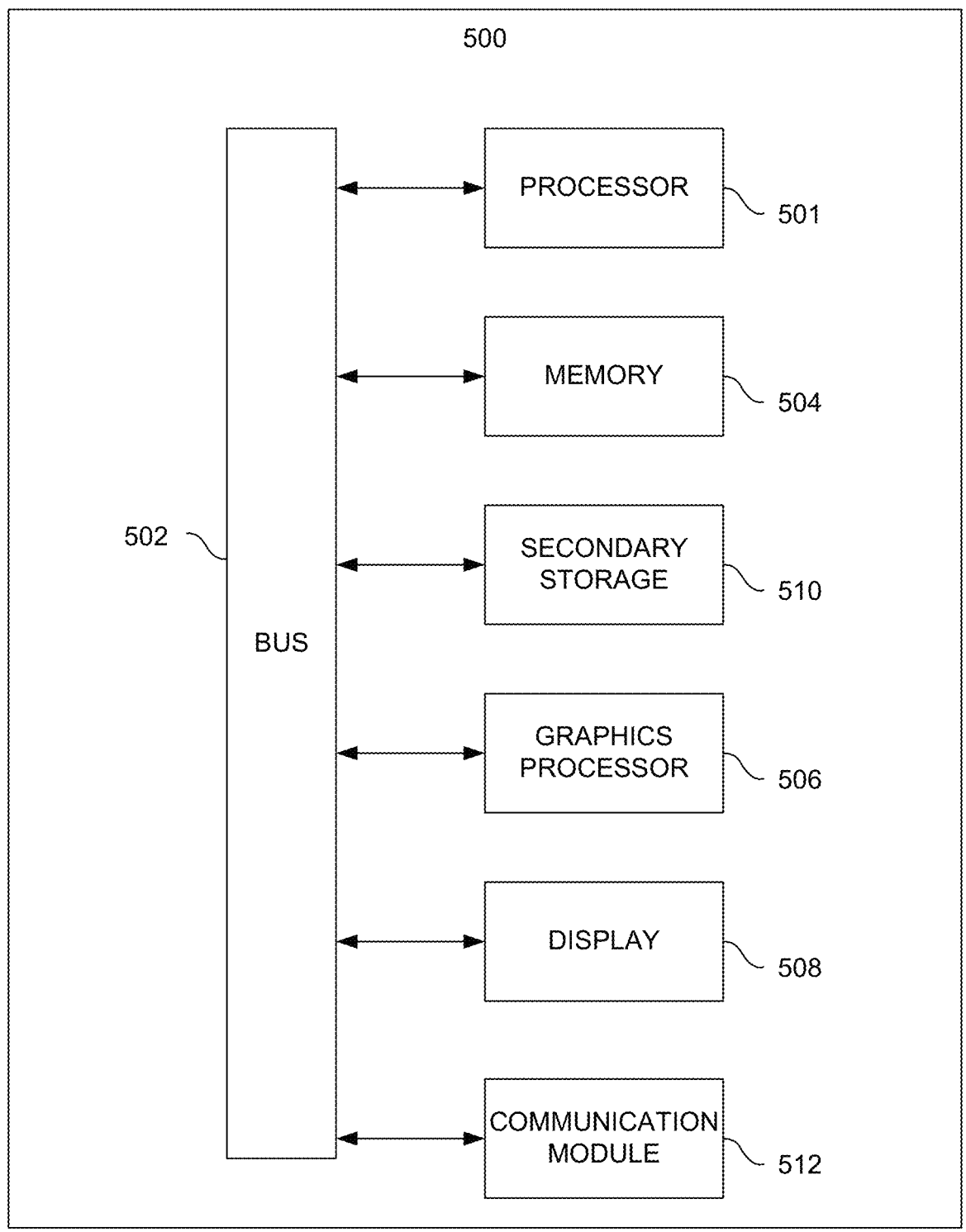
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:

training a machine learning model to infer, for different combinations of a customer with each of a plurality of customer service agents, an outcome expected with respect to the customer service agent communicating with the customer to provide retail assistance within a physical retail store, wherein the machine learning model is trained using prior retail behavior recorded for the customer by a provider of the physical retail store, wherein the outcome that the machine learning model is trained to infer is a monetary value selected from one of:
a positive value for customer purchases,
a negative value for customer refunds, and
zero for no customer action;
identifying presence of the customer in the physical retail store, wherein at least one of:
the customer is included in a customer group identified as having a presence at a physical retail store, and wherein the customer is selected from the customer group based on a determination, made using the information describing the customer, that the customer is an influencer within the customer group, or
the presence of the customer in the physical retail store is identified using a facial recognition algorithm;
determining a plurality of customer service agents available to assist the customer in the physical retail store;
for each customer service agent of the plurality of customer service agents available to assist the customer in the physical retail store, processing information describing the customer and information describing the customer service agent, using the machine learning model, to determine an expected outcome of an interaction of the customer service agent with the customer occurring within the physical retail store including a monetary value that is one of:
a positive value for a customer purchase,
a negative value for a customer refund, and
zero for the customer taking no action;
selecting one customer service agent of the plurality of customer service agents for assisting the customer in the physical retail store, based on the expected outcome determined for each customer service agent of the plurality of customer service agents;
dynamically generating assistance information for the customer service agent, based at least in part on the expected outcome of the interaction of the customer service agent with the customer and a skill level of the customer service agent, wherein the assistance information is customized to the expected outcome of the interaction of the customer service agent with the customer and to the customer service agent that is to assist the customer in the physical retail store; and
outputting the assistance information to the customer service agent for use in assisting the customer in the physical retail store.

2. The non-transitory computer readable medium of claim 1, wherein the presence of the customer in the physical retail store is identified using mobile device recognition.

3. The non-transitory computer readable medium of claim 1, further comprising:
collecting the information describing the customer.

4. The non-transitory computer readable medium of claim 3, wherein the information describing the customer includes at least one of:
demographic information,
information indicating prior purchases,
information indicating a current mood, or
information indicating a current context of the presence in the physical store.

5. The non-transitory computer readable medium of claim 1, wherein the machine learning model that determines the expected outcome is further trained using data in a customer relationship management system indicating prior purchases of the customer and spending of the customer, and publicly available data including details about the customer collected from social networks.

6. The non-transitory computer readable medium of claim 1, wherein the assistance information includes at least a portion of the information describing the customer.

7. The non-transitory computer readable medium of claim 1, wherein the assistance information includes the expected outcome of the interaction with the customer occurring within the physical retail store.

8. The non-transitory computer readable medium of claim 1, wherein the assistance information includes at least one of:
one or more suggested actions for the customer service agent to take in association with the customer including a language for the customer service agent to use that corresponds with a language of the customer, or
a script for the customer service agent to use for interacting with the customer.

9. The non-transitory computer readable medium of claim 1, further comprising:
outputting the assistance information to the customer service agent while the customer is present in the physical retail store;
tracking an interaction between the customer service agent and the customer;
dynamically updating the assistance information, based on the tracking of the interaction between the customer service agent and the customer; and
providing the updated assistance information to the customer service agent while the customer is present at the physical retail store.

10. The non-transitory computer readable medium of claim 1, wherein outputting the assistance information to the customer service agent includes presenting the assistance information on a mobile device of the customer service agent.

11. The non-transitory computer readable medium of claim 1, wherein outputting the assistance information to the customer service agent includes presenting the assistance information on a lens of augmented reality (AR) glasses worn by the customer service agent.

12. The non-transitory computer readable medium of claim 1, wherein outputting the assistance information to the customer service agent includes audibly outputting the assistance information to a hearing device worn by the customer service agent.

13. A method, comprising:
training a machine learning model to infer, for different combinations of a customer with each of a plurality of customer service agents, an outcome expected with respect to the customer service agent communicating with the customer to provide retail assistance within a physical retail store, wherein the machine learning model is trained using prior retail behavior recorded for the customer by a provider of the physical retail store, wherein the outcome that the machine learning model is trained to infer is a monetary value selected from one of:
a positive value for customer purchases,
a negative value for customer refunds, and
zero for no customer action;
identifying presence of the customer in the physical retail store, wherein at least one of:
the customer is included in a customer group identified as having a presence at a physical retail store, and wherein the customer is selected from the customer group based on a determination, made using the information describing the customer, that the customer is an influencer within the customer group, or the presence of the customer in the physical retail store is identified using a facial recognition algorithm;

determining a plurality of customer service agents available to assist the customer in the physical retail store;

for each customer service agent of the plurality of customer service agents available to assist the customer in the physical retail store, processing information describing the customer and information describing the customer service agent, using the machine learning model, to determine an expected outcome of an interaction of the customer service agent with the customer occurring within the physical retail store including a monetary value that is one of:

a positive value for a customer purchase, a negative value for a customer refund, and zero for the customer taking no action;

selecting one customer service agent of the plurality of customer service agents for assisting the customer in the physical retail store, based on the expected outcome determined for each customer service agent of the plurality of customer service agents;

dynamically generating assistance information for the customer service agent, based at least in part on the expected outcome of the interaction of the customer service agent with the customer and a skill level of the customer service agent, wherein the assistance information is customized to the expected outcome of the interaction of the customer service agent with the customer and to the customer service agent that is to assist the customer in the physical retail store; and outputting the assistance information to the customer service agent for use in assisting the customer in the physical retail store.

14. A system, comprising:

a non-transitory memory storing instructions; and one or more processors in communication with the non-transitory memory that execute the instructions to perform a method comprising:

training a machine learning model to infer, for different combinations of a customer with each of a plurality of customer service agents, an outcome expected with respect to the customer service agent communicating with the customer to provide retail assistance within a physical retail store, wherein the machine learning model is trained using prior retail behavior recorded for the customer by a provider of the physical retail store, wherein the outcome that the machine learning model is trained to infer is a monetary value selected from one of:

a positive value for customer purchases, a negative value for customer refunds, and zero for no customer action;

identifying presence of the customer in the physical retail store;

determining a plurality of customer service agents available to assist the customer in the physical retail store;

for each customer service agent of the plurality of customer service agents available to assist the customer in the physical retail store, processing information describing the customer and information describing the customer service agent, using the machine learning model, to determine an expected outcome of an interaction of the customer service agent with the customer occurring within the physical retail store including a monetary value that is one of:

a positive value for a customer purchase, a negative value for a customer refund, and zero for the customer taking no action;

selecting one customer service agent of the plurality of customer service agents for assisting the customer in the physical retail store, based on the expected outcome determined for each customer service agent of the plurality of customer service agents;

dynamically generating assistance information for the customer service agent, based at least in part on the expected outcome of the interaction of the customer service agent with the customer and a skill level of the customer service agent, wherein the assistance information is customized to the expected outcome of the interaction of the customer service agent with the customer and to the customer service agent that is to assist the customer in the physical retail store; and outputting the assistance information to the customer service agent for use in assisting the customer in the physical retail store, including presenting the assistance information on a lens of augmented reality (AR) glasses worn by the customer service agent.

* * * * *